J. B. HAWLEY.
TABLE VESSEL.
APPLICATION FILED AUG. 16, 1916.
1,243,405.
Patented Oct. 16, 1917.
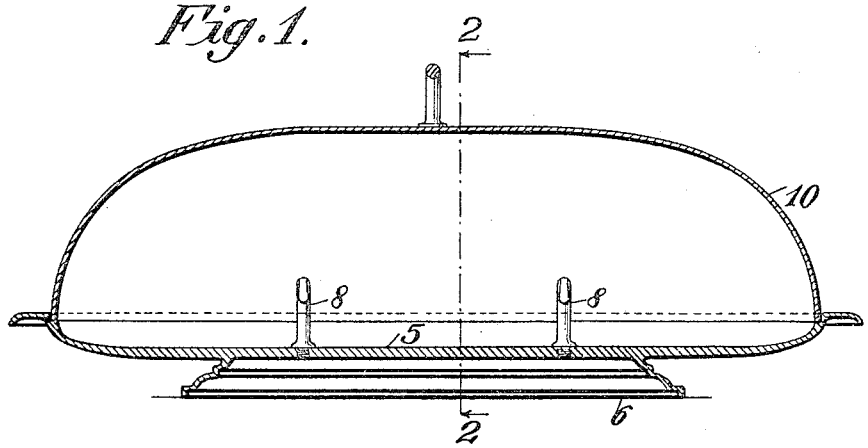
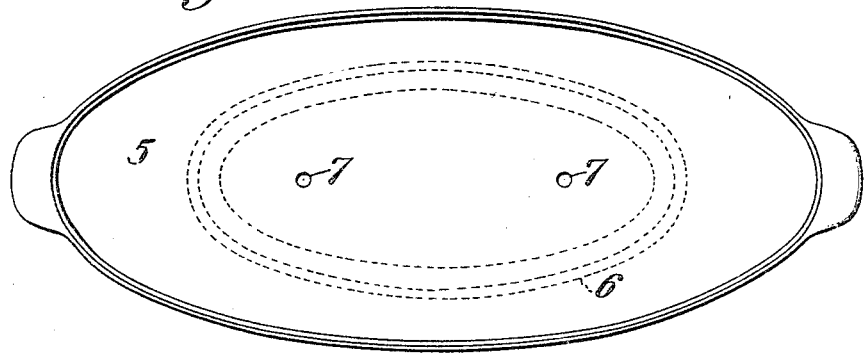
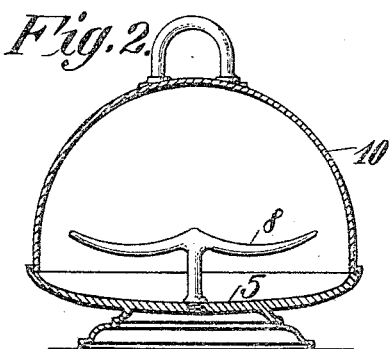
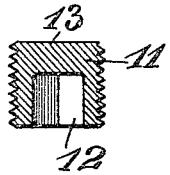
Witnesses:
Fred. Rogers.
Louise Keller.
John Bentley Hawley, Inventor
By Henry Schreiter his Attorney

UNITED STATES PATENT OFFICE.

JOHN BENTLEY HAWLEY, OF CARTHAGE, NEW YORK.

TABLE VESSEL.

1,243,405.  Specification of Letters Patent.  Patented Oct. 16, 1917.

Application filed August 16, 1916. Serial No. 115,235.

*To all whom it may concern:*

Be it known that I, JOHN BENTLEY HAWLEY, a citizen of the United States, and resident of Carthage, in the county of Jefferson and State of New York, have invented certain new and useful Improvements in Table Vessels, of which the following is a full, clear, and complete specification.

My invention relates to the manufacture of table vessels, and consists in the devising of a vessel for serving green corn on the ear, and adapted to be readily converted into a vessel suitable for other uses in table service.

A vessel produced in accordance with my invention is illustrated in the accompanying drawings, in which—

Figure 1 is a longitudinal section thereof;

Fig. 2 is a section taken on line 2—2 of Fig. 1.

Fig. 3 is a plan of the vessel shown in Figs. 1 and 2, and

Fig. 4 is a sectional view on an enlarged scale of a plug adapted to be used adjunctively with the vessel shown in the other figures.

The vessel, shown in the drawing, comprises a platter 5, having a supporting base 6, a cover 10, a pair of rack members 8, removably mounted in the screw-threaded perforations 7 in the platter 5, and the plugs 11 whereby the perforations are closed when the platter is to be used for other purposes. The screw-threaded perforations are arranged preferably in line of the longitudinal axis of the platter. Each of the rack members 8 comprises a shank, screw-threaded on its end, and two suitably shaped arms, whereon the ears of corn to be served are supported above the platter, which, in connection with the cover 10, shaped to inclose the ears of corn laid on the racks 8, and to produce a closed receptacle when set onto the platter 5, results in enabling the corn to be prepared for service and kept "steaming hot" uniformly. For this purpose the circumferential edge of the platter 5 is recessed or suitably flanged. A table vessel capable of affording this advantage is of great utility in hotels, restaurants and other establishments, where a larger number of patrons are to be served at a time. It makes it possible to prepare, in advance, the requisite number of portions to be served, and yet to have the corn in proper condition, tender and hot, when served to the guests.

In view of the circumstance that the utensil as thus far described could be used only during the "hot corn season," the corn racks 8 are made removable and plugs 11 fitted into the screw-threaded perforations in the platter are provided for filling the latter when the rack members are removed. One of the plugs 11, is shown in Fig. 4, and it will be noted that it is externally threaded throughout its length, and that a recess 12, suitably shaped for inserting therein a key is provided. The other ends 13 of the plugs 11 are smoothly finished, so that when the racks 8 are removed (unscrewed) and the plugs 11 are screwed in, into the perforations 7, the plugs 11 will fill the perforations and the platter 5 will have a smooth bottom and will then be suitable for any service.

I claim as my invention:

1. A service vessel comprising a platter having perforations adapted to secure therein interchangeable elements, and racks and plugs adapted to be removably secured in the perforations of the platter, substantially as herein shown and described.

2. A service vessel comprising a platter having screw-threaded perforations, racks each having a correspondingly screw-threaded shank, fitted into the screw-threaded perforations, and correspondingly externally threaded plugs adapted to fill the perforations when the racks are not used, substantially as herein shown and described.

JOHN BENTLEY HAWLEY.

Witnesses:
F. C. ANDERSON,
J. H. JONES.

Copies of this patent may be obtained for five cents each, by addressing the "Commissioner of Patents, Washington, D. C."